E. P. ROGERS.
Instrument for Finding the Center of Circles.
No. 50,275. Patented Oct. 3, 1865.
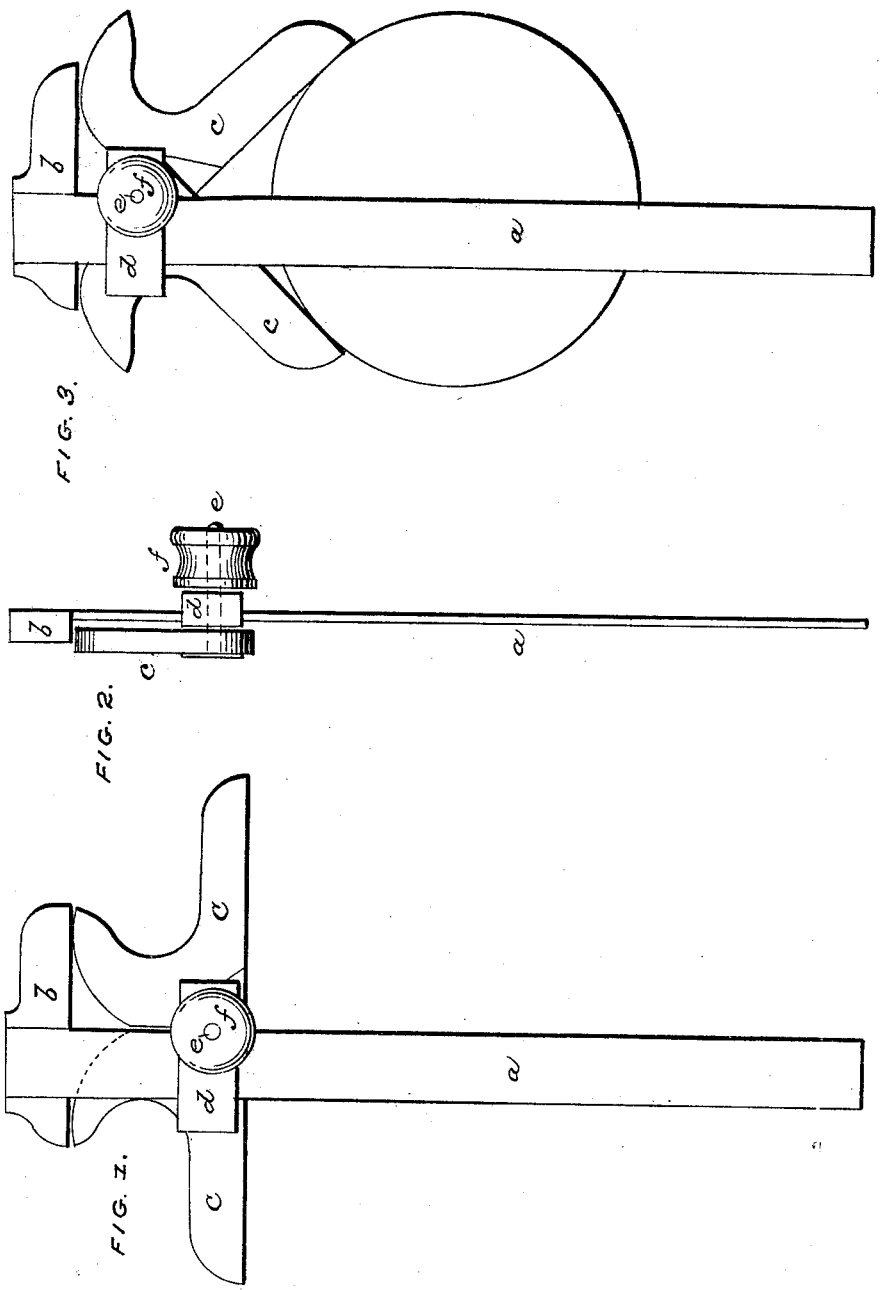

UNITED STATES PATENT OFFICE.

EPHRAIM P. ROGERS, OF CORNING, NEW YORK.

IMPROVEMENT IN INSTRUMENTS FOR FINDING THE CENTERS OF CIRCLES.

Specification forming part of Letters Patent No. 50,275, dated October 3, 1865.

*To all whom it may concern:*

Be it known that I, EPHRAIM P. ROGERS, of Corning, in the county of Steuben and State of New York, have invented a new and useful Instrument for Finding the Center or Radius of Circles and Circular Arcs; and I do hereby declare that the following is a full, clear, and exact description of the construction and operation of the same, reference being had to the annexed drawings, making a part of this specification, in which—

Figures 1 and 3 are top views, and Fig. 2 an edge view, of the instrument.

$a$ is the tongue.

$b$ is a transverse bar firmly attached to the tongue $a$.

$d$ is a slide embracing the tongue $a$ and moving freely along the same.

$c\ c$ are two jaws turning in a joint upon the center-pin $e$.

$e$ is a center-pin passing through the joint of the jaws $c\ c$ and the slide $d$, and is cut away so as to allow the edge of the tongue $a$ to pass through its center.

$f$ is a nut screwed upon the center-pin $e$, by means of which the tongue $a$, the jaws $c\ c$, and the slide $d$ are pinched firmly together.

When the jaws of the instrument are thrown open to their utmost extent and moved down so as to bring their curved bases to rest upon the transverse bar $b$, it is a T-square, as at Fig. 1. Loosen the nut $f$ and move the slide $d$ downward or nearer the bar $b$, and the face edges of the jaws $c\ c$ will turn inward, forming an angle of greater or less extent; and by means of their curved bases moving in contact with the bar $b$, such angle will be equally divided by the edge of the tongue $a$, as at Fig. 3. Thus the instrument may be adjusted to suit any sized circle and used for finding the center or radius of any piece of circular work to which it can be externally applied, or for laying out the teeth of all kinds of ordinary gearing. Move the jaws away from contact with the bar $b$ and the instrument may be used as a bevel, or the jaws $c\ c$ may be adjusted so as to form unequal angles with the tongue $a$, so that its edge will become a tangent to a lesser circle than the one with which the jaws are in contact. Thus it may be conveniently adjusted and used for laying out screw bevel-gearing or ratchet-teeth. Reverse the position of the jaws so as to bring their faces in contact with the bar $b$, turning their curved bases outward, and the instrument can be applied to a circle internally for the same purposes and with the same degree of accuracy as otherwise externally.

What I claim as my invention, and desire to secure by Letters Patent is—

The construction of an instrument, substantially as described, so that two jaws, as at $c\ c$, Fig. 3, with corresponding outline, turning upon a center-pin, $e$, may be simultaneously adjusted so as to touch convenient points in any circle, while the line of the inner edge of the tongue $a$ shall be the radius of such circle.

EPHRAIM P. ROGERS.

Witnesses:
 WM. WALKER,
 E. D. LANSING.